United States Patent [19]

Lai

[11] Patent Number: 5,768,130

[45] Date of Patent: Jun. 16, 1998

[54] METHOD OF CALCULATING MACROCELL POWER AND DELAY VALUES

[75] Inventor: C. Stanley Lai, San Jose, Calif.

[73] Assignee: LSI Logic Corporation, Milpitas, Calif.

[21] Appl. No.: 441,539

[22] Filed: May 15, 1995

[51] Int. Cl.⁶ .................................................. G06F 17/50
[52] U.S. Cl. ........................ 364/489; 364/554; 364/579; 364/578
[58] Field of Search ......................... 364/578, 488, 364/489, 551.01, 554, 579, 468.15, 172; 395/500

[56] References Cited

U.S. PATENT DOCUMENTS

| 5,014,226 | 5/1991 | Horstmann et al. | 364/551.01 |
| 5,274,568 | 12/1993 | Blinne et al. | 364/489 |
| 5,406,497 | 4/1995 | Altheimer | 364/489 |
| 5,500,808 | 3/1996 | Wang | 364/578 |
| 5,544,071 | 8/1996 | Keren et al. | 364/489 |

OTHER PUBLICATIONS

Lewis et al., "Smoothing Time Series for Input and Output Analysis In System Simulation Experiments", IEEE, 1990, pp. 46–48.

Elnaggar et al., "System Identification and Adaptive Control Based on a Variables Regression for Systems Having Unknown Delays," IEEE, 1990, pp. 1445–1450.

Vemuru et al., "A Model for Delay Evaluation of a CMOS Inverter", IEEE, 1990, pp. 89–92.

*Primary Examiner*—Kevin J. Teska
*Assistant Examiner*—Thai Phan
*Attorney, Agent, or Firm*—Katz & Cotton,LLP

[57] ABSTRACT

Techniques for computing power and delay values for macrocells in an ASIC design are described whereby the power or delay values are encoded as a multi-dimensional mathematical expression relating the power or delay value to the values of a plurality of operating conditions. The mathematical expression is derived from a multiple regression analysis of a plurality of power or delay sample values determined for a plurality of specific operating conditions. Delay values are derived directly from the mathematical relationship. Power dissipation values are determined by encoding current draw as a function of the various operating conditions. When a predicted current draw value is computed, it is multiplied by a value of power supply voltage to determine power dissipation.

29 Claims, 3 Drawing Sheets

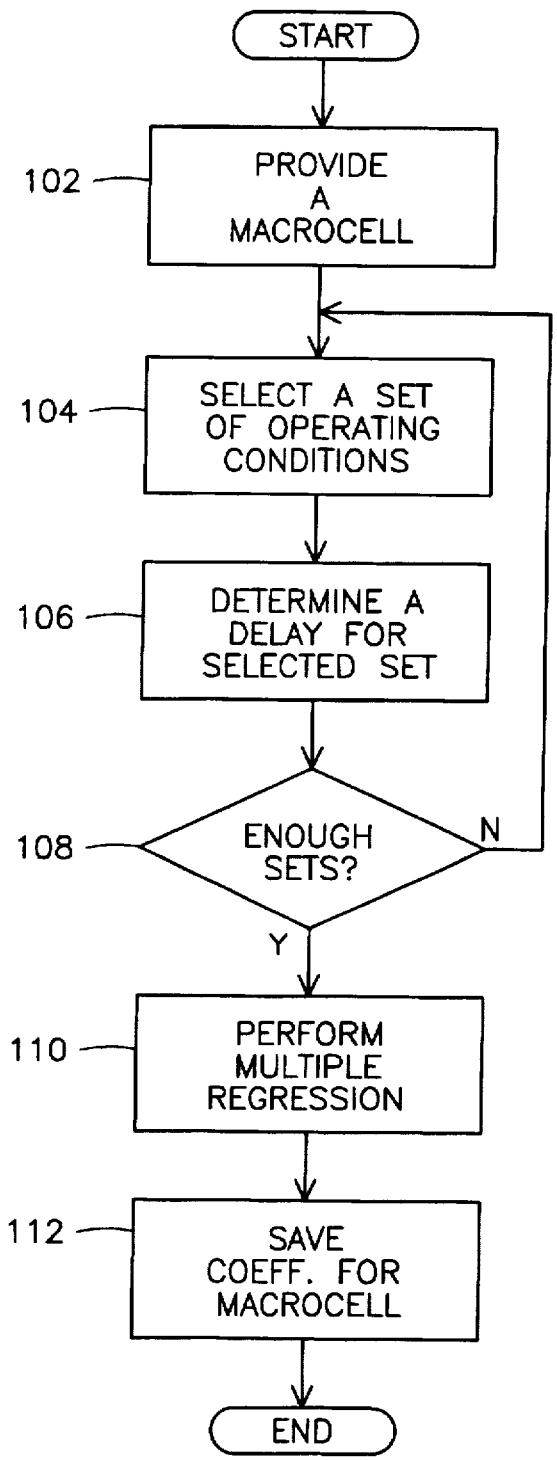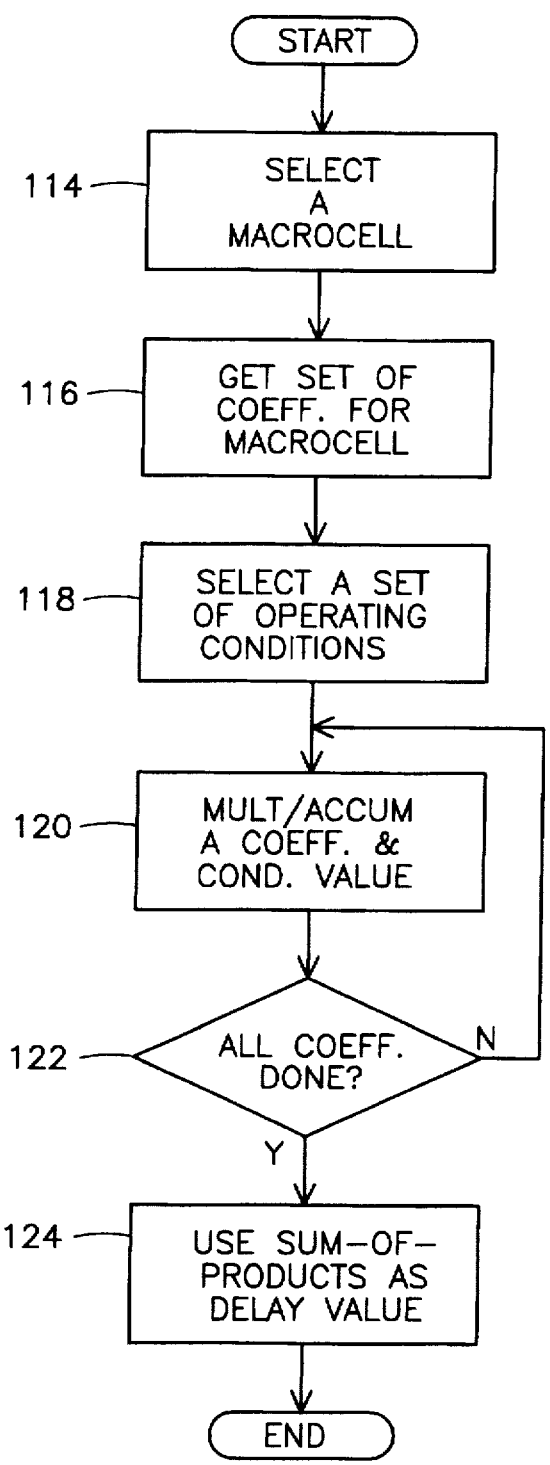
FIGURE 1a
FIGURE 1b

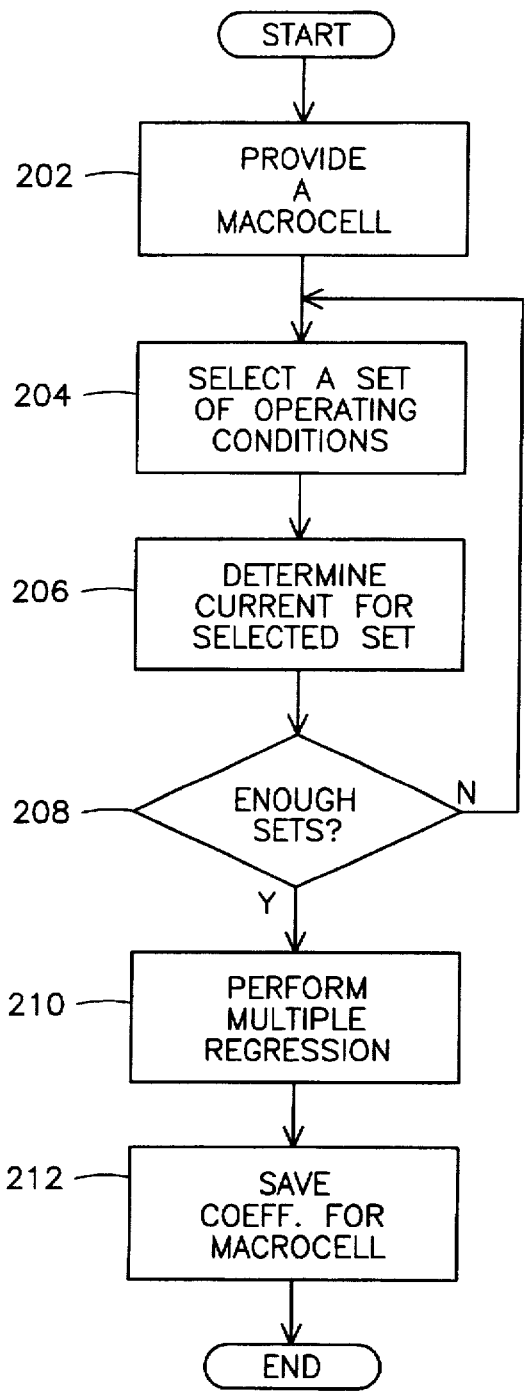
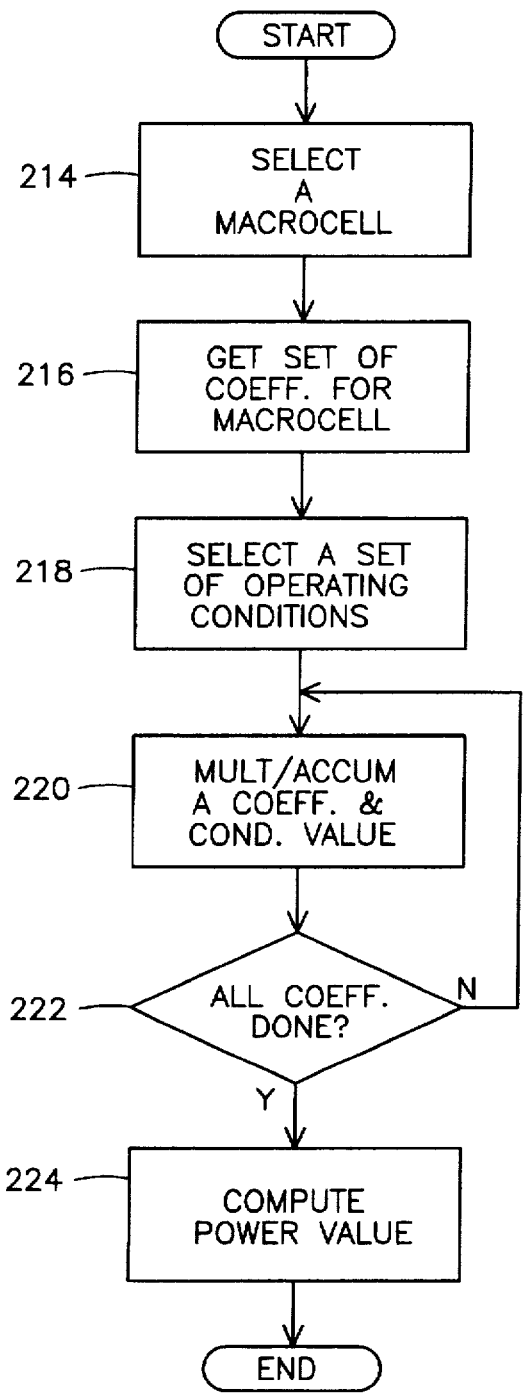
FIGURE 2a
FIGURE 2b 5,768,130

METHOD OF CALCULATING MACROCELL POWER AND DELAY VALUES

TECHNICAL FIELD OF THE INVENTION

The invention relates to ECAD (Electronic Computer Aided Design) Systems, more particularly to automated cell-based integrated circuit and ASIC (Application Specific Integrated Circuit) design, and still more particularly to methods for predicting performance-related characteristics of cell-based integrated circuit and ASIC designs.

BACKGROUND OF THE INVENTION

Practically all modern integrated circuit design is performed on computer-aided design systems specifically targeted at facilitating design, layout, simulation and fabrication of integrated circuit designs. These systems are often referred to as ECAD systems. Increasingly, end users are taking a greater part in the design of integrated circuits, often through the use of cell-based designs.

In cell-based design, standard electronic "building blocks" known as "macrocells" are provided to the designer. Such macrocells can perform low-level or high-level logic functions, even highly complicated functions such as complete microprocessors and peripheral controllers. The designer "connects" these macrocells together to create an integrated circuit design which performs one or more desired functions. In the modern integrated circuit marketplace, macrocell-based design capability and integrated circuits designed in this manner are becoming more and more commonplace. In order to distinguish such "building-block", macrocell-type designs from full-custom design, the integrated circuits designed with macrocells by end users thereof are often referred to a "ASICs" or Application Specification Integrated Circuits (indicating that their design is targeted to a specific user application, rather than to an off-the-shelf market).

With the move towards end users participating in the design of semi-custom, cell-based integrated circuits (ASICs), and the like, it has become increasingly important for the integrated circuit vendor (provider of the macrocells and other software, and often the fabricator of the designed component) and the ASIC designer (working for the end user on the end user's design equipment, possibly using third party software in conjunction with the macrocells) to establish their respective responsibilities in producing the integrated circuit (ASIC) design and in providing the finished ASIC chips. Clearly, it is essential that the designer and the integrated circuit vendor agree upon functional and performance-related expectations of the target device (e.g., ASIC) so that if a problem occurs, their respective responsibilities are clear.

Ordinarily, the agreement between designer and vendor is such that the designer certifies that as designed, the ASIC design performs the desired logical functions. This is usually bolstered by simulation results which demonstrate that the ASIC chip, when provided with appropriate stimulus, behaves in a specific, predictable fashion within specified timing tolerances. The user certifies that the simulation results reflect the chip behavior he desires. The vendor (who often provides or certifies the simulations) agrees that the ASIC chip will perform as predicted by the simulations. Accordingly, in the interest of both parties, it is essential that the simulation results accurately predict the performance of the ASIC chip.

Among the most critical performance parameters in simulating the behavior of an ASIC design accurately is signal propagation delay through a macrocell. It is well known to those of ordinary skill in the art that propagation delay in electronic logic circuits is dependent upon a number of conditions including, but not limited to, power supply voltage, signal rise and fall time, and temperature. The propagation delay is usually determined and verified by exhaustive transistor-level simulation, and sometimes by physical testing, of the macrocells by the integrated circuit manufacturer (ASIC provider), under a variety of operating conditions. The propagation delays observed during simulation and testing between the various inputs and outputs of the macrocell are then stored in a form which is accessible to a simulator.

Another performance criteria which is of great interest, both to the designer and to the ASIC provider, is power dissipation. Excessive power usage by an ASIC can require the user of the ASIC to provide expensive and otherwise unnecessary cooling in a product. Further, many new products are intended to be incorporated into low-power, battery-operated products. Clearly, power dissipation is of great interest. It is well known in the art that power dissipation is affected by power supply voltage, signal rise and fall times, and operating temperature. Operating frequency also may have a significant, direct effect on power dissipation. As with propagation delay, power dissipation of macrocells may be determined by simulation and testing of the macrocells under a variety of conditions. Many modern design systems provide for some measure of estimation of power dissipation.

Unfortunately, it is generally not practical to determine or to catalogue exhaustive propagation delay and power dissipation performance criteria for all possible combinations of the multiple factors that may (and generally will) influence these performance criteria. Further, an ASIC designer may wish to estimate the performance of a macrocell under conditions of power supply voltage, temperature, operating frequency, rise/fall times, etc., for which the macrocell has not been specifically tested. The ASIC designer is then forced to simulate the macrocell (generally as part of an ASIC design) under conditions which do not exactly match the desired conditions. This leaves the ASIC designer with some doubt as to the exact performance which can be expected of the target ASIC design which uses the macrocell. Short of running a circuit-level simulation (e.g., a SPICE simulation—SPICE is an electronic circuit simulation technique), which can be extremely time-consuming, the ASIC designer has little recourse. In many cases, even the option of performing a circuit level simulation is unavailable to the ASIC designer, since the ASIC provider often (generally) may not provide the designer with low-level (e.g., circuit level) models of their macrocells.

What is needed is a technique for obtaining reasonably accurate estimates of power dissipation and propagation delay performance of macrocells, without requiring either low-level simulations or massive compilations of performance data.

DISCLOSURE OF THE INVENTION

It is therefore an object of the present invention to provide a technique for accurately estimating propagation delay for macrocells over a wide range of operating conditions.

It is a further object of the present invention to provide a technique for accurately estimating propagation delay for macrocells under operating conditions for which propagation delay has not been specifically determined.

It is a further object of the present invention to provide a technique for accurately estimating propagation delay for macrocells for any value of an operating condition (e.g., temperature, power supply voltage, signal rise/fall time, operating frequency, etc.) within a valid range of values for that operating condition.

It is a further object of the present invention to provide a technique for accurately estimating propagation delay for macrocells for any combination of values of multiple operating conditions (e.g., temperature, power supply voltage, signal rise/fall time, operating frequency, etc.) which falls within a set of valid ranges of values for those operating conditions.

It is a further object of the present invention to provide a technique for specifying propagation delay of a macrocell as a function of the values of a plurality of operating conditions.

It is a further object of the present invention to provide a technique for accurately estimating propagation delay for macrocells which is easily transferrable between different ECAD systems.

It is a further object of the present invention to provide a technique for accurately estimating propagation delay for macrocells which requires minimal storage space on an ECAD system.

It is therefore an object of the present invention to provide a technique for accurately estimating power dissipation for macrocells over a wide range of operating conditions.

It is a further object of the present invention to provide a technique for accurately estimating power dissipation for macrocells under operating conditions for which power dissipation has not been specifically determined.

It is a further object of the present invention to provide a technique for accurately estimating power dissipation for macrocells for any value of an operating condition (e.g., temperature, power supply voltage, signal rise/fall time, operating frequency, etc.) within a valid range of values for that operating condition.

It is a further object of the present invention to provide a technique for accurately estimating power dissipation for macrocells for any combination of values of multiple operating conditions (e.g., temperature, power supply voltage, signal rise/fall time, operating frequency, etc.) which falls within a set of valid ranges of values for those operating conditions.

It is a further object of the present invention to provide a technique for specifying power dissipation of a macrocell as a function of the values of a plurality of operating conditions.

It is a further object of the present invention to provide a technique for accurately estimating power dissipation for macrocells which is easily transferrable between different ECAD systems.

It is a further object of the present invention to provide a technique for accurately estimating power dissipation for macrocells which requires little storage space on an ECAD system.

According to the invention, propagation delay is determined for a macrocell by simulation (or by direct measurement) at a plurality of operating points which represent a variety of values of a plurality of operating conditions. These operating conditions (hence, operating points) include power supply voltage, temperature, operating frequency, signal rise and fall times, and the like.

A multiple regression analysis is performed on these operating (data) points to determine a multi-dimensional propagation delay function for the macrocell, where the various "dimensions" of the function represent the various operating conditions under consideration. In other words, the result of the multiple regression analysis is a single-valued mathematical function which returns propagation delay values as a function of the values of the various operating conditions. A different mathematical function can be provided for each input-to-output combination for a macrocell, as may be required.

According to an aspect of the invention, the mathematical function can be expressed as a set of coefficients, one coefficient for each of the various operating conditions under consideration. The coefficients can then be stored as a part of a timing model for the macrocell. In order to estimate the propagation delay for a macrocell for a given set of values for the operating conditions, a sum of the products of each coefficient and the value of its respective operating condition is calculated. The result is a propagation delay estimate.

The coefficients of the mathematical function require relatively little storage space in the ECAD system and can readily be exchanged between different ECAD systems. Since the coefficients derived in the technique of the present invention are simply numerical values, the different ECAD systems can implement the sum-of-products algorithm required to produce the propagation delay value differently, while computing the same end result for the same set of operating conditions.

Further, according to the invention, a technique for estimating power dissipation for a macrocell is provided in a manner similar to the technique described above for estimating propagation delay. Average current draw is determined for a macrocell by simulation (or by direct measurement) at a plurality of operating (data) points which represent a variety of values of a plurality of operating conditions. These operating conditions can include power supply voltage, temperature, operating frequency, signal rise and fall times, and the like. A multiple regression analysis is performed on these data points to determine a multi-dimensional current draw function for the macrocell, where the various "dimensions" represent the operating conditions. That is, the result of the multiple regression analysis is a single-valued mathematical function which returns an average current draw value as a function of the values of the various operating conditions.

Once the average current draw is determined, it is multiplied by the value of the power supply voltage to determine power dissipation.

As with the aforementioned mathematic function for propagation delay estimation, the mathematical function for power dissipation can be expressed as a set of coefficients, one for each operating condition. The coefficients can then be stored as a part of a model for the macrocell. In order to estimate the power dissipation for a macrocell at a given set of values of the operating conditions, a sum of the products of each coefficient and the value of its respective operating condition is calculated. The result is the power dissipation estimate.

As with the propagation delay estimating technique, the power dissipation function coefficients require little storage space and can readily be exchanged between different ECAD systems to provide "portability" of the estimating technique.

Other objects, features and advantages of the invention will become apparent in light of the following description thereof.

BRIEF DESCRIPTION OF THE DRAWINGS

FIG. 1a is a flowchart of a technique for representing delay for a macrocell as a function of a plurality of operating conditions, according to the invention.

FIG. 1b is a flowchart of a technique for calculating a delay estimate for a macrocell according to a functional representation, according to the invention.

FIG. 2a is a flowchart of a technique for representing power dissipation for a macrocell as a function of a plurality of operating conditions, according to the invention.

FIG. 2b is a flowchart of a technique for calculating a power dissipation estimate for a macrocell according to a functional representation, according to the invention.

DETAILED DESCRIPTION OF THE INVENTION

Figure 3:
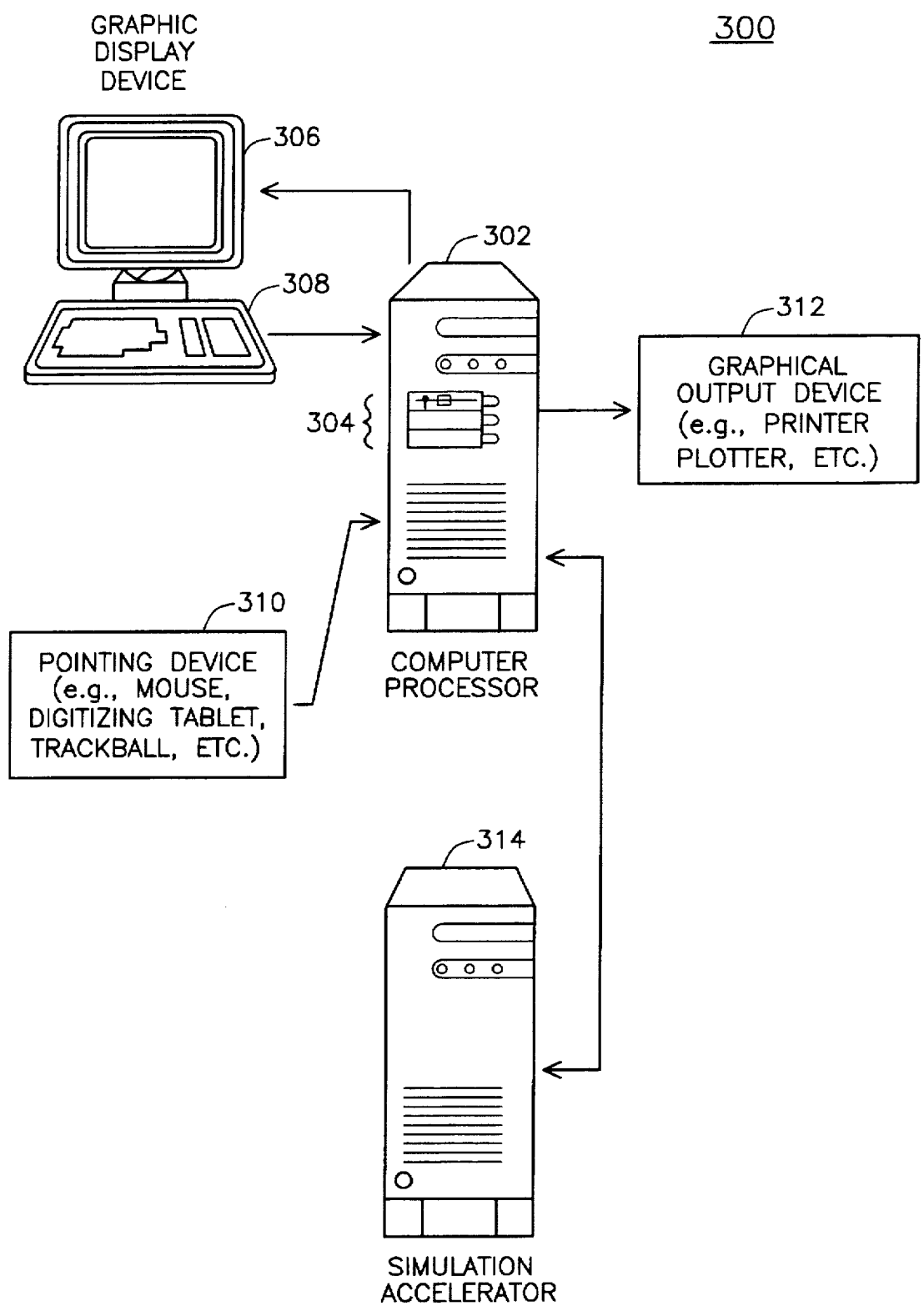
FIG. 3 is a diagram of a representative (exemplary) ECAD system upon which the techniques of the present invention can be practiced.

According to the invention, propagation delay is determined for a macrocell by simulation or by direct measurement at a plurality of operating points which represent a variety of values of a plurality of operating conditions. These operating conditions can include power supply voltage, temperature, operating frequency, signal rise and fall times, etc. A multiple regression analysis is performed on these data points to determine a multi-dimensional propagation delay function for the macrocell, where the various "dimensions" represent the operating conditions. That is, the result of the multiple regression analysis is a single-valued mathematical function which returns propagation delay values as a function of the values of the various operating conditions. A different mathematical function can be provided for each input-to-output combination for the macrocell, as required.

It will be readily understood by one of ordinary skill in the art that "propagation delay for a macrocell" refers to a propagation delay between a specific input and a specific output of the macrocell. There can be many different input to output combinations on any given macrocell.

It will further be appreciated by one of ordinary skill in the art that for clocked systems, the techniques for estimating "propagation delay" for a macrocell can be applied to an operating condition-dependent setup time and/or hold time at an input of the macrocell relative to a signal transition at another input of the macrocell. These setup and hold times derive from internal propagation delays within macrocells, but their effect may not be immediately observable at an output of the macrocell. Since setup and hold times are, in essence, "hidden" propagation delays, they behave in much the same fashion as "normal" propagation delays and can be expressed in much the same manner.

In general, the inventive techniques described herein are intended to be performed on an ECAD system. As will be readily appreciated by one of ordinary skill in the art, an ECAD system can be assumed to include a computer processor, memory, storage devices, means for interaction with a user (e.g., mouse, keyboard, display, etc.), and means for simulation. The techniques described herein are intended to be implemented on an ECAD system, as a part of a design process. Other software may also be running on the ECAD system, such as schematic capture software, and the like.

In order to arrive at a suitable mathematical function, for estimating power and/or delay, it is necessary to provide a technique for predicting the value of a variable, y, (which in this case represents delay) for any given values of one or more variables, $X_j$, (which represent the various operating conditions).

By taking a variety of measurements of delay values (y) over a variety of different operating conditions ($x_j$ values), it may be assumed that the relation among several variables is of a given form (e.g., a second degree polynomial) without necessarily specifying the numerical values of all the constants in the equation. Regression analysis provides a suitable, systematic technique for estimating, with confidence limits, the unspecified constants from a new set of data, or for testing whether the new data are consistent with the assumption.

If a variable y depends linearly on several factors, an effective approach is to use a formula involving all of the factors for predicting y. A plurality, k, of such factors, or variables, can be represented by $x_1, x_2, \ldots, x_k$, and a sample of "n" observations would consist of "n" sets of values: $x_{11}, x_{21}, \ldots, x_{k1}, Y_1; x_{12}, x_{22}, \ldots, x_{k2}, y_2; \ldots;$ and $x_{1n}, x_{2n}, \ldots, x_{kn}, y_n$. (The subscript denoting the particular observation is omitted for most of the following discussion, and the representative factor is denoted by $x_j$ where $j=1, 2, \ldots, k$.)

According to the technique of the present invention, the delay performance of a typical (e.g., CMOS) macrocell can be closely approximated as a first order linear function of the values of its operating conditions, where the operating conditions can include, for example, operating temperature, power supply voltage, input and output loading, signal rise and fall times, operating frequency, etc. Accordingly, a multiple linear regression technique can be used to determine coefficients for the first order linear function.

The methods of multiple linear regression presuppose a linear relationship between the value of "y" and the other variables (which suits the instant problem of determining a first order multi-variable function for delay ideally). A rough check on this assumption can be made by graphing "y" against the various "x's" taken one at a time.

The predicted value, y', can be expressed by the sample regression equation:

$$y' = a + b_1 x_1 + b_2 x_2 + \ldots + b_k x_k$$

where $x_j$ are the variables (operating conditions) affecting y (delay value), the partial regression coefficients $b_j$, are determined as described in greater detail hereinbelow, and $$a = \bar{y} - b_1 \bar{x}_1 - b_2 \bar{x}_2 - \ldots - b_k \bar{x}_k$$

where sample averages are represented by overbar notation, i.e., $\bar{y}$ means average value of y for samples taken.

Thus the regression equation could also be written $$y' - \bar{y} = b_1(x_1 - \bar{x}_1) + b_2(x_2 - \bar{x}_2) + \ldots + b_k(x_k - \bar{x}_k)$$

This equation represents the best-fitting plane for the sample data plotted in k+1 dimensions, in the sense of the least sum of squares of y deviations.

The partial regression coefficient $b_j$ in the regression equation can be determined by solving the equation:

$$b_1 \Sigma (x_1 - \bar{x}_1)^2 + b_2 \Sigma (x_1 - \bar{x}_1)(x_2 - \bar{x}_2) + \ldots +$$

$$b_k \Sigma (x_1 - \bar{x}_1)(x_k - \bar{x}_k) = \Sigma (x_1 - \bar{x}_1)(y - \bar{y})$$

$$b_1 \Sigma (x_2 - \bar{x}_2)(x_1 - \bar{x}_1) + b_2 \Sigma (x_2 - \bar{x}_2)^2 + \ldots +$$

$$b_k \Sigma (x_2 - \bar{x}_2)(x_k - \bar{x}_k) = \Sigma (x_2 - \bar{x}_2)(y - \bar{y})$$

...

-continued $$b_1 \Sigma (x_1 - \bar{x}_1)(x_1 - \bar{x}_1) + b_1 \Sigma (x_1 - \bar{x}_1)(x_2 - \bar{x}_2) + \ldots +$$

$$b_k \Sigma (x_1 - \bar{x}_1)^2 = \Sigma (x_2 - \bar{x}_2)(y - \bar{y})$$

Each sum has "n" terms for the "n" sample members. Thus:

$$\Sigma (x_1 - \bar{x}_1)^2 = \sum_{i=1}^{n} (x_{1i} - \bar{x}_1)^2$$

(Note that the second subscript has been omitted from the equations as a notational convenience.)

To simplify the notation, the following notational equivalence can be made:

$$a_{hj} = n \Sigma (x_h - \bar{x}_h)(x_j - \bar{x}_j) = n \Sigma x_h x_j - \Sigma x_h \Sigma x_j$$

noting that: $a_{hj} = a_{jh}$ and that: $a_{jj} = n \Sigma x_j^2$ $$a_{jy} = n \Sigma x_j y - \Sigma x_j \Sigma y$$

$$a_{yy} = n \Sigma y^2 - (\Sigma y)^2$$

With this notation, the correlation coefficient $r_{hj}$ between $x_h$ and $x_j$ can conveniently be written as:

$$r_{hj} = \frac{a_{hj}}{\sqrt{a_{hh} a_{jj}}}$$

Using the notational equivalences, the normal expressions can be re-expressed as an equivalent set of simultaneous equations (each multiplied by "n"):

$$a_{11}b_1 + a_{12}b_2 + \ldots + a_{1k}b_k = a_{1y}$$

$$a_{21}b_1 + a_{22}b_2 + \ldots + a_{2k}b_k = a_{2y}$$

$$a_{k1}b_1 + a_{k2}b_2 + \ldots + a_{kk}b_k = a_{ky}$$

Many techniques are known to those skilled in the art for solving systems of simultaneous equations. Any suitable method may be used, but for large systems of equations (e.g., more than three independent variables, or many repetitions) the solution may most readily be obtained using high-speed machine techniques. One technique which is readily adapted to machine methods and which is well suited to the present discussion is that of inverting the matrix of coefficients $a_{hj}$. This involves solving for the "b's" by replacing the column of constants $a_{jy}$ successively with 1, 0, 0, ..., 0, for obtaining values $e_{11}, e_{12}, \ldots, e_{1k}$; with 0, 1, 0, ..., 0, for obtaining values $e_{21}, e_{22}, \ldots, e_{2k}$; ...; and with 0, 0, ..., 0, 1, for obtaining values $e_{k1}, e_{k2}, \ldots, e_{kk}$. For example, $e_{11}, e_{12}, \ldots, e_{1k}$ satisfy the system of simultaneous equations:

$$a_{11}e_{11} + a_{12}e_{12} + \ldots + a_{1k}e_{1k} = 1$$

$$a_{21}e_{11} + a_{22}e_{12} + \ldots + a_{2k}e_{1k} = 0$$

$$a_{31}e_{11} + a_{32}e_{12} + \ldots + a_{3k}e_{1k} = 0$$

. . .

$$a_{k1}e_{11} + a_{k2}e_{12} + \ldots + a_{kk}e_{1k} = 0$$

The solution of the set of equations in this manner yields the following result with respect to the partial regression coefficients $b_j$:

$$b_j = \sum_{h=1}^{k} a_{hy} e_{hj}$$

In order to predict the value of y' (delay value) for a macrocell from a set of $x_j$ (operating condition) values, the operating condition values are simply "plugged into" the original linear equation for which the coefficients $b_j$ were determined:

$$y' = a + b_1 x_1 + b_2 x_2 + \ldots + b_k x_k$$

Since the form of the mathematical equation is established, the only values which are required to uniquely specify the functional relationship between the predicted (or estimated) delay value (y') for a macrocell and the values of its operating conditions ($x_j$) are values for the coefficients $b_j$ and the value "a" (which is determined as described hereinabove from the sample averages). The mathematical function, then, is expressed as a set of coefficients, one for each operating condition. The coefficients are stored (in the ECAD system) as a part of a timing model for the macrocell. In order to estimate the propagation delay for a macrocell for a given set of values for the operating conditions, the sample regression equation is evaluated using the coefficients and the values of the operating conditions. The result is the propagation delay estimate.

A "quality factor", $r^2$, which indicates how well the multi-variable linear function reflects the sample data, can be determined as follows:

$$r^2_{y|1,2,\ldots,k} = \frac{b_1 a_{1y} + b_2 a_{2y} + \ldots + b_k a_{ky}}{a_{yy}}$$

The quality factor can assume any value between 0 and 1 with a value of 0 indicating that the value of "y" appears to be completely independent of the sample regression equation using the $b_j$ coefficients (i.e., no correlation) and a value of 1 indicating exact or perfect correlation between the predicted values (y') according to the equation and the actual determined values (y).

The coefficients of the mathematical function, which require relatively little storage space, can readily be exchanged between different ECAD systems (using any conventional medium for exchanging such information). Since the coefficients are straightforward numerical values, different ECAD systems can implement the sum-of-products algorithm required to produce the propagation delay value in different manners, but will nevertheless be assured of computing a like result for the same set of operating conditions.

FIG. 1a is a flowchart of a method for encoding the delay associated with a macrocell as a function of a plurality of operating conditions, such as the operating conditions described hereinabove. In a first step 102, a macrocell design is provided. In a second step 104, a specific set of operating conditions is selected (e.g., specific operating temperature, power supply voltage, input and output loading factors, signal rise/fall times, etc.). In a third step 106, the delay value for the macrocell operating under the specified operating conditions is determined, either by direct measurement or by simulation (preferably a detailed low-level circuit simulation such as a SPICE simulation). In a fourth step 108, it is determined whether enough delay values for enough sets of operating conditions have been determined to adequately represent the multidimensional delay performance of the macrocell have been determined. (Preferably, delay will be determined for at least three different values of each operating condition). If not, steps 104 and 106 are repeated until enough values have been determined. Once the enough delay values have been determined, a fifth step 110 performs a multiple regression analysis of the delay values and the operating condition values for which the delay values were determined to arrive at a set of linear expression coefficients relating the delay value to the operating condition values. In a sixth step 112, these coefficient values are stored for the macrocell, to be retrieved later for predicting delay performance under any arbitrary set of operating conditions.

This process can be performed for each input-to-output combination (or for every input-to-input setup and/or hold relationship) on the macrocell. Similar analyses can be performed for every available macrocell. Typically, this analysis would be performed by an ASIC provider (the designer of the macrocells) and the coefficients would be provided along with timing models of the macrocells.

FIG. 1b is a flowchart of the process by which the delay value for a macrocell is predicted using the coefficients derived in the process of FIG. 1a. It is assumed that the steps described hereinabove with respect to FIG. 1a have been previously performed.

In a first step 114, a macrocell is selected for which delay performance is desired. In a second step 116, the (previously stored) coefficients corresponding to the delay performance of the selected macrocell are retrieved. In a third step 118, a set of operating conditions for which the delay performance of the macrocell is to be predicted is selected. The operating conditions and coefficients are then "plugged into" the sample regression equation (described in detail hereinabove) and the delay value is computed. This process is represented by fourth, fifth, and sixth steps 120, 122, and 124, respectively, whereby the sample regression equation is evaluated in a sum-of-products method to arrive at the delay value. In the fourth step 120, a coefficient and a corresponding operating condition value are selected and multiplied together. The fifth step 122 repeats the fourth step 120 until all coefficient/operating-condition-value pairs have been multiplied. A running sum (accumulation) of the products is kept in the fourth step 120. In the fifth step 124, when all products have been accounted for, the running sum (the sum of products) represents the delay value for the macrocell.

The coefficients of the mathematical function, which require relatively little storage space, can readily be exchanged between different ECAD systems. Since the coefficients are merely numerical values, the different ECAD systems can implement the sum-of-products algorithm required to produce the propagation delay value differently, but still compute the same result for the same set of operating conditions.

Appended hereto is a document entitled "An Innovative Technique to Model the CMOS Macrocell Delay With Multiple Regression", by Stanley Lai, dated May 25, 1993. This document further describes the inventive technique with respect to delay prediction and provides details experimental results, and is incorporated by reference herewith.

According to the invention, accurate estimates of power dissipation for a macrocell can be determined in identical fashion. It will be readily appreciated by one of ordinary skill in the art that average power dissipation by a macrocell can be expressed as:

$$P_{av} = I_{av} \times V_{DD} \times \left( \frac{F}{F_{ref}} \right)$$

where:

$I_{av}$ is the average current draw of the macrocell under a specific set of operating conditions;

$V_{DD}$ is the power supply voltage;

F is the operating frequency of the macrocell; and $F_{ref}$ is a reference operating frequency for which $I_{av}$ was determined This equation represents power dissipation by a macrocell as a linear function of operating frequency. This equation, however, is specified for only one set of operating conditions, ignoring, for example, temperature. It will be noted that the power does not appear to be linearly related to both voltage and frequency, but rather to the product of these two operating conditions. However, it is posited herewith that average current draw of a macrocell can be expressed as a linear function of a plurality of operating conditions, including but not limited to those described hereinabove. A suitable multi-variable (multidimensional) linear expression for current can be derived by a technique similar to that described hereinabove for delay estimation. The current can then be multiplied by the power supply voltage value to determine power dissipation.

Accordingly, the same multiple regression technique used to express delay performance as a linear function of a plurality of variables (operating condition values) can be used to express the current draw of a macrocell as a linear function of a plurality of variables. By substituting "current draw" for "delay" in the discussion hereinabove with respect to multiple regression analysis, a mathematical expression relating current draw to operating conditions is produced which can be represented by a set of coefficients. Predicted current draw value derived from this expression are then multiplied by the power supply voltage to determine power dissipation.

It will be readily appreciated by one of ordinary skill in the art that this technique can be applied to predicting either average current or RMS current to produce estimates of either average power or RMS power, respectively.

FIGS. 2a and 2b are flowcharts which show the processes for encoding power dissipation of a macrocell as a set of coefficients for a linear function and for predicting the power dissipation given a set of operating conditions and the coefficients. Since the processes described in FIGS. 2a and 2b are similar to those described in FIGS. 1a and 1b, their descriptions (which follow) are very similar to the descriptions of FIGS. 1a and 1b hereinabove.

FIG. 2a is a flowchart of a method for encoding the power dissipation of a macrocell as a function of a plurality of operating conditions, such as the operating conditions described hereinabove. In a first step 202, a macrocell design is provided. In a second step 204, a specific set of operating conditions is selected (e.g., specific operating temperature, power supply voltage, input and output loading factors, signal rise/fall times, etc.). In a third step 206, the current draw (e.g., average or RMS, as desired) for the macrocell operating under the specified operating conditions is determined, either by direct measurement or by simulation (preferably a detailed low-level circuit simulation such as a SPICE simulation). In a fourth step 208, it is determined whether enough current draw values for enough sets of operating conditions have been determined to adequately represent the multidimensional current draw performance of the macrocell have been determined. (Preferably, values will be determined for at least three different values of each operating condition). If not, steps 204 and 206 are repeated until enough values have been determined. Once the enough current draw values have been determined, a fifth step 210 performs a multiple regression analysis of the current draw values and the operating condition values for which the current draw values were determined to arrive at a set of linear expression coefficients relating the current draw value to the operating condition values. In a sixth step 212, these coefficient values are stored for the macrocell, to be retrieved later for predicting power dissipation performance under any arbitrary set of operating conditions.

Similar analyses can be performed for every available macrocell. Typically, this analysis would be performed by an ASIC provider (the designer of the macrocells) and the coefficients would be provided along with timing models of the macrocells.

FIG. 2b is a flowchart of the process by which the power dissipation for a macrocell is predicted using the coefficients derived in the process of FIG. 2a. It is assumed that the steps described hereinabove with respect to FIG. 2a have been previously performed.

In a first step 214, a macrocell is selected for which a prediction of power dissipation is desired. In a second step 216, the (previously stored) coefficients corresponding to the current draw of the selected macrocell are retrieved. In a third step 218, a set of operating conditions for which the power dissipation performance of the macrocell is to be predicted is selected. The operating conditions and coefficients are then "plugged into" the sample regression equation (described in detail hereinabove) and the current draw value is computed. This process is represented by fourth, fifth, and sixth steps 220, 222, and 224, respectively, whereby the sample regression equation is evaluated in a sum-of-products method to arrive at the current draw value. In the fourth step 220, a coefficient and a corresponding operating condition value are selected and multiplied together. The fifth step 222 repeats the fourth step 220 until all coefficient/operating-condition-value pairs have been multiplied. A running sum (accumulation) of the products is kept in the fourth step 220. In the fifth step 224, when all products have been accounted for, the running sum (the sum of products) is multiplied by the power supply voltage value to produce the power dissipation value for the macrocell.

As with the propagation delay estimating technique, the power dissipation function coefficients require little storage space and can readily be exchanged between different ECAD systems to provide "portability" of the estimating technique.

FIG. 3 is a block diagram of an exemplary ECAD system 300 on which the inventive techniques can readily be implemented. Such an ECAD system 300 typically includes a computer processor 302, storage devices 304, a graphic display device 306, a keyboard 308, a pointing device 310 (such as a mouse, digitizing tablet, trackball, etc.), a graphical output device 312 (e.g., printer, plotter), and means 314 for simulating an electronic design. The means for simulating 314 are provided by a simulation accelerator in the FIG. One of ordinary skill in the art will realize that all-software simulation techniques can be effectively employed, as well. Such techniques run a simulation program on the computer processor 302. Generally, software simulation techniques run slower, but perform the same functions.

Appended hereto is a document entitled "A New Methodology to Calculate ASIC Macrocell Power With Multiple Regression Technique", by Stanley Lai, dated Sep. 30, 1993, further describing the inventive technique with respect to power dissipation prediction, and detailing experimental results, and is incorporated by reference herein.

What is claimed is:

1. Method of calculating a characteristic of a macrocell at a particular set of operating conditions, comprising:

for a macrocell, determining a plurality of characteristics of a plurality of different sets of operating conditions;

entering, to an ECAD system, data representative of the plurality of characteristics of the plurality of different sets of operating conditions;

determining a mathematical function based on multiple regression analysis of the data representative of the plurality of characteristics of the plurality of different sets of operating conditions; and computing, in the ECAD system, a characteristic of the macrocell at a particular set of operating conditions having values unequal to any set of the plurality of different sets of operating conditions.

2. Method, according to claim 1, wherein:

the characteristic is power dissipation of the macrocell.

3. Method, according to claim 2, further comprising:

selecting operating conditions of the plurality of different sets of operating conditions from a group consisting of power supply voltage, temperature, operating frequency and signal rise and fall times of the macrocell.

4. Method, according to claim 1, wherein:

the characteristic is propagation delay for the macrocell.

5. Method, according to claim 4, further comprising:

selecting operating conditions of the plurality of different sets of operating conditions from a group consisting of power supply voltage, temperature, operating frequency and signal rise and fall times of the macrocell.

6. Method, according to claim 1, further comprising:

expressing the mathematical finction as a set of coefficients, each coefficient representing one type of operating condition.

7. Method, according to claim 6, further comprising:

determining the characteristic of the macrocell by a sum of products of each of the set of coefficients and the single-valued mathematical function of its respective operating condition.

8. Method, according to claim 6, further comprising:

storing the set of coefficients in the ECAD system; and associating the stored coefficients with the macrocell.

9. Method, according to claim 6, further comprising:

communicating the set of coefficients to another ECAD system.

10. Method of encoding, on an ECAD system, delay performance of a macrocell as a function of a plurality of operating conditions, comprising:

providing an ECAD system, the ECAD system including a computer processor and means for simulating an electronic design;

providing, on the ECAD system, a macrocell design; and determining delay values for the macrocell design for a plurality of different values of a plurality of operating conditions; and analyzing the delay values and operating conditions for which the delay values were determined to provide a mathematical function which computes a delay value for the macrocell as a function of the values of the operating conditions.

11. A method according to claim 10, wherein:

the mathematical function has a predetermined form.

12. A method according to claim 11, wherein:

the mathematical function is a linear function of the values of the plurality of operating conditions, having one coefficient for each of the operating conditions.

13. A method according to claim 12, further comprising:

on the ECAD system, storing the coefficients for later retrieval.

14. A method according to claim 10, wherein:

the step of determining delay values further comprises repeating, on the ECAD system, the steps of:
specifying values for a plurality of operating conditions; and
simulating the macrocell for the specified values of the operating conditions to determine a delay value for the macrocell;
until delay values have been determined at a plurality of values for each operating condition.

15. A method according to claim 14, wherein:

the step of analyzing comprises, performing a multiple regression analysis on the delay values and operating condition values for which the delay values were determined to produce a set of coefficients relating the delay values to the values of the operating conditions.

16. Method of encoding, on an ECAD system, power dissipation performance of a macrocell as a function of a plurality of operating conditions, comprising:

providing an ECAD system, the ECAD system including a computer processor and means for simulating an electronic design;

providing, on the ECAD system, a macrocell design; and determining current draw values for the macrocell design for a plurality of different values of a plurality of operating conditions; and analyzing the current draw values and operating conditions for which the current draw values were determined to provide a mathematical function which computes a current draw value for the macrocell as a function of the values of the operating conditions.

17. A method according to claim 16, wherein:

the mathematical function has a predetermined form.

18. A method according to claim 17, wherein:

the mathematical function is a linear function of the values of the plurality of operating conditions, having one coefficient for each of the operating conditions.

19. A method according to claimn 18, further comprising:

on the ECAD system, storing the coefficients for later retrieval.

20. A method according to claim 16, wherein:

the step of determining current draw values further comprises repeating, on the ECAD system, the steps of:
specifying values for a plurality of operating conditions; and
simulating the macrocell for the specified values of the operating conditions to determine a current draw value for the macrocell;
until current draw values have been determined at a plurality of values for each operating condition.

21. A method according to claim 20, wherein:

the step of analyzing comprises, performing a multiple regression analysis on the current draw values and operating condition values for which the current draw values were determined to produce a set of coefficients relating the current draw values to the values of the operating conditions.

22. A method of predicting a delay value for a macrocell from a set of specified operating conditions, comprising:

providing, on an ECAD system, a set of coefficients for a mathematical function, said mathematical finction having a pre-specified form and relating a delay value for a macrocell to values of a plurality of operating conditions;

specitying the values of the specified operating conditions;

calculating the delay value for the macrocell according to the mathematical fuinction according to the values of the coefficients and the values of the specified operating conditions.

23. A method according to claim 22, wherein:

the mathematical function describes the delay value for the macrocell as a linear function of the values of the plurality of operating conditions.

24. A method according to claim 22, wherein:

the mathematical function is a sample regression equation and the coefficients are partial regression coefficients for a corresponding operating condition value.

25. A method according to claim 22, wherein:

the delay value is calculated by computing a sum-of-products whereby the products of the coefficients and the value of their corresponding operating condition are added together.

26. A method of predicting a power dissipation value for a macrocell from a set of specified operating conditions, comprising:

providing, on an ECAD system, a set of coefficients for a mathematical function, said mathematical function having a pre-specified form and relating a current draw value for a macrocell to values of a plurality of operating conditions;

specifying the values of the plurality of operating conditions;

calculating the current draw value for the macrocell according to the mathematical function according to the values of the coefficients and the values of the operating conditions; and multiplying the current draw value by a value for power supply voltage to produce a power dissipation value for the macrocell.

27. A method according to claim 26, wherein:

the mathematical function describes the current draw value for the macrocell as a linear function of the values of the plurality of operating conditions.

28. A method according to claim 26, wherein:

the mathematical function is a sample regression equation and the coefficients are partial regression coefficients for a corresponding operating condition value.

29. A method according to claim 26, wherein:

the current draw value is calculated by computing a sum-of-products whereby the products of the coefficients and the value of their corresponding operating condition are added together.

* * * * *